United States Patent
Tomikawa et al.

(10) Patent No.: US 8,873,126 B2
(45) Date of Patent: Oct. 28, 2014

(54) ELECTROOPTIC DEVICE AND ELECTRONIC APPARATUS

(75) Inventors: Naoki Tomikawa, Fujimi-machi (JP); Hiroyuki Hara, Chino (JP); Tomoki Yokota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 13/550,815

(22) Filed: Jul. 17, 2012

(65) Prior Publication Data

US 2013/0021657 A1   Jan. 24, 2013

(30) Foreign Application Priority Data

Jul. 21, 2011   (JP) ................... 2011-159616

(51) Int. Cl.
| G02F 1/03 | (2006.01) |
| G02F 1/07 | (2006.01) |
| G02F 1/29 | (2006.01) |
| H01H 3/00 | (2006.01) |

(52) U.S. Cl.
CPC ....................... *G02F 1/03* (2013.01)
USPC .................. 359/245; 359/315; 359/348

(58) Field of Classification Search
CPC .... G02B 26/001; G02B 26/004; G02B 1/167; G02B 1/055
USPC .......................... 359/245, 315, 348
See application file for complete search history.

(56) References Cited

U.S. PATENT DOCUMENTS

| 7,764,346 B2 | 7/2010 | Tadaki et al. |
| 8,081,153 B2 | 12/2011 | Shirasaka et al. |
| 2002/0180688 A1* | 12/2002 | Drzaic et al. .................. 345/107 |
| 2005/0007653 A1* | 1/2005 | Honeyman et al. ........... 359/321 |

FOREIGN PATENT DOCUMENTS

| JP | 4-86812 A | 3/1992 | |
| JP | 5-297393 A | 11/1993 | |
| JP | 5-323336 A | 12/1993 | |
| JP | 05323336 A | * 12/1993 | ............ G02F 1/1341 |
| JP | 8-201830 A | 8/1996 | |
| JP | 10-123526 A | 5/1998 | |
| JP | 10-133212 A | 5/1998 | |
| JP | 2000-221521 A | 8/2000 | |
| JP | 2005-257990 A | 9/2005 | |
| JP | 2007-316119 A | 12/2007 | |
| JP | 2008-58497 A | 3/2008 | |
| JP | 2008-89938 A | 4/2008 | |
| JP | 2008-292861 A | 12/2008 | |
| JP | 2009-92697 A | 4/2009 | |
| JP | 2011-159616 A | 8/2011 | |
| JP | 2011-178249 A | 9/2011 | |
| WO | WO-2006-098002 A | 9/2006 | |

* cited by examiner

*Primary Examiner* — Scott J Sugarman
*Assistant Examiner* — Mustak Choudhury
(74) *Attorney, Agent, or Firm* — ALG Intellectual Property, LLC

(57) ABSTRACT

An electrooptic device includes first and second substrates that are disposed opposing each other with an electrooptic material layer therebetween, a sealing material that bonds the first and second substrates, a pixel area, and an ion trap portion between the pixel area and the sealing material. The ion trap portion includes first and second electrodes that are formed in a comb-tooth shape and are disposed so that branch electrodes of the first electrode and branch electrodes of the second electrode are engaged with each other. A direction of the branch electrodes intersects with an orientation direction of the electrooptic material at an interface between the electrooptic material layer and the first substrate.

16 Claims, 3 Drawing Sheets

ELECTROOPTIC DEVICE AND ELECTRONIC APPARATUS

BACKGROUND

1. Technical Field

The present invention relates to electrooptic devices and electronic apparatuses.

2. Related Art

With regard to liquid crystal devices, it is known that, when light enters a liquid crystal material, an oriented film or the like included therein, various kinds of ionic impurities are generated through photochemical reactions and cause degradation in display quality of the liquid crystal device such as uneven display and the like. In a liquid crystal device used as a light valve of a projector, liquid crystal, oriented films, and so on included therein need higher light resistance because the luminous flux density of incident light is much higher than that in the case of a direct-view-type liquid crystal device. In order to realize a high light resistance, it is necessary to suppress ionic impurities which are generated as a result of light irradiation and cause a defect in display and the like from being integrated in a display area.

It is also known that the following ionic impurities diffuse into a display area depending on driving operation, difference in temperature and the like of liquid crystal and cohere therein so as to cause degradation in display properties; that is, an ionic impurity mingled with liquid crystal when the liquid crystal is injected into a liquid crystal device, an ionic impurity eluted from a sealing material or an end-sealing material surrounding a liquid crystal layer, and so on. In particular, in the case where an inorganic oriented film made of silicon oxide or the like is used, impurities are likely to be adsorbed to the outer edge of the display area, whereby a blur, unevenness, or the like can be generated due to localized impurities.

Meanwhile, liquid crystal devices that include measures for trapping ionic impurities in liquid crystal layers are publicly known (JP-A-5-323336, JP-A-2000-221521, JP-A-8-201830, JP-A-10-123526, JP-A-2008-58497, JPA-2008-89938). The liquid crystal devices described in JP-A-5-323336, JP-A-2000-221521, JP-A-8-201830 and JP-A-10-123526 are devices in which a pair of electrodes is formed on interior surfaces of a pair of substrates holding a liquid crystal layer, and ionic impurities in the liquid crystal layer are trapped by an electric field generated in the depth direction of the liquid crystal layer (longitudinal electric field) between the pair of electrodes. The liquid crystal devices described in JP-A-2008-58497 and JPA-2008-89938 are devices in which a pair of electrodes is formed side by side on one of a pair of substrates holding a liquid crystal layer, and ionic impurities in the liquid crystal layer are trapped by an electric field generated in the substrate surface direction (transverse electric field) between the pair of electrodes.

However, in the liquid crystal devices described in JP-A-5-323336, JP-A-2000-221521, JP-A-8-201830 and JP-A-10-123526, because the pair of electrodes is disposed opposing each other while holding a liquid crystal layer that is as much as a few micrometers thick, it has been difficult to generate a strong electric field between the electrodes so as to enhance efficiency of the trapping. On the other hand, in the liquid crystal devices described in JP-A-2008-58497 and JP-A-2008-89938, a relatively strong electric field can be generated with ease; however, because an equipotential plane is formed along a direction in which comb-tooth shape electrodes extend, there has been a problem in that it is difficult to trap ionic impurities moving along the direction in which the above electrodes extend.

SUMMARY

An advantage of some aspects of the invention is to provide an electrooptic device in which higher efficiency of ionic impurity trapping is realized using a transverse electric field technique.

An electrooptic device according to an aspect of the invention includes: a first substrate and a second substrate that are disposed opposing each other with an electrooptic material layer therebetween; a sealing material that bonds the first and second substrates to each other; a pixel area in which a plurality of pixels are arranged; and an ion trap portion that is formed along an outer edge area between the pixel area and the sealing material. Further, the ion trap portion is formed on the electrooptic material layer side of the first substrate, and includes a first electrode and a second electrode that are formed in a comb-tooth shape when viewed from above and are disposed so that branch electrodes of the first electrode and branch electrodes of the second electrode are engaged with each other. Furthermore, a direction in which the branch electrodes of the first and second electrodes extend is oblique with respect to an external side of the first substrate in the vicinity of those branch electrodes, and intersects with an orientation direction of the electrooptic material at an interface between the electrooptic material layer and the first substrate.

In this configuration, the branch electrodes of the first and second electrodes having a comb-tooth shape are both formed oblique with respect to an external side of the first substrate. This makes it possible to cause a direction of an equipotential line that is formed along the extension direction of the branch electrodes and a movement direction of an ionic impurity that is eluted from the sealing material and moves toward the ion trap portion to intersect with each other. As a result, at least part of an adsorption force that acts from the ion trap portion upon the ionic impurity is made to act along the movement direction of the ionic impurity, which in turn makes it possible to efficiently trap ionic impurities generated from the sealing material.

Meanwhile, in the pixel area, ionic impurities are likely to move along the orientation direction of the electrooptic material. Accordingly, in this configuration, the branch electrodes are so disposed as to intersect with the orientation direction of the electrooptic material. This makes it possible to cause at least part of the adsorption force from the ion trap portion to act along the movement direction of ionic impurities moving from the pixel area toward the ion trap portion, whereby ionic impurities generated in the pixel area can be efficiently trapped.

With the configuration described above, since any of ionic impurities generated in the inner and outer peripheries of the ion trap portion can be efficiently trapped, it is possible to effectively suppress ionic impurities from adhering to the pixel area and consequently provide an electrooptic device in which display troubles such as a blur, unevenness, and so on are unlikely to occur.

It is preferable that the direction in which the branch electrodes extend be a direction that intersects with the orientation direction of the electrooptic material at an angle of equal to or greater than 75 degrees and equal to or less than 105 degrees in the electrooptic device.

With this configuration, ionic impurities having moved from the pixel area to an outer edge area can be efficiently trapped at the ion trap portion.

It is preferable that the direction in which the branch electrodes extend be a direction that is approximately orthogonal to the orientation direction of the electrooptic material in the electrooptic device.

With this configuration, ionic impurities having moved from the pixel area to an outer edge area can be most efficiently trapped at the ion trap portion.

In the electrooptic device, it is preferable that the pixel area be formed in an approximately rectangular shape when viewed from above, and intervals between the branch electrodes of the first electrode and the branch electrodes of the second electrode be smaller at areas of the ion trap portion that are located in two corners of the pixel area approximately facing the orientation direction of the electrooptic material than the intervals therebetween at other areas of the ion trap portion.

With this configuration, it is possible to make a larger adsorption force act upon ionic impurities in an area where the ionic impurities that are generated in the pixel area and caused to move along with driving operation of the electrooptic material are likely to accumulate. Therefore, even if the concentration of ionic impurities increases due to the accumulation of ionic impurities, the diffusion of the ionic impurities into the pixel area due to difference in the concentration of ionic impurities can be suppressed.

An electronic apparatus according to another aspect of the invention includes the aforementioned electrooptic device.

With this configuration, it is possible to provide an electronic apparatus with excellent reliability in which display troubles caused by ionic impurities, such as a blur, unevenness and so on, are unlikely to occur.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
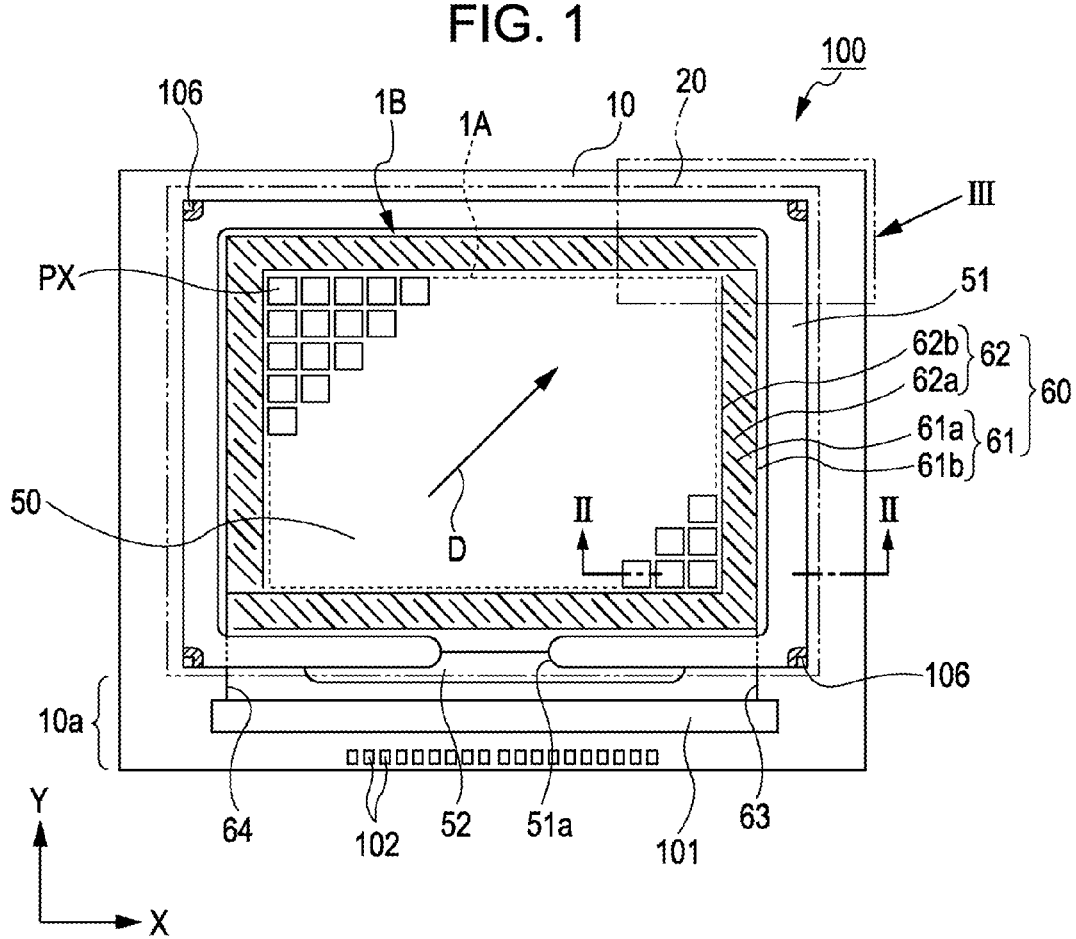
FIG. 1 is a plan view illustrating a liquid crystal device as an embodiment of an electrooptic device according to the invention.

Hereinafter, embodiments of the invention will be described with reference to the drawings.

Note that the scope of the invention is not limited to the embodiments described below, and variations thereon can be arbitrarily made within the range of technical spirit of the invention. In addition, in order to facilitate understanding of the configurations illustrated in the drawings, scales, numbers and the like of the constituent elements of the structures in the drawings may be different from those of the actual structures as needed.

Figure 2:
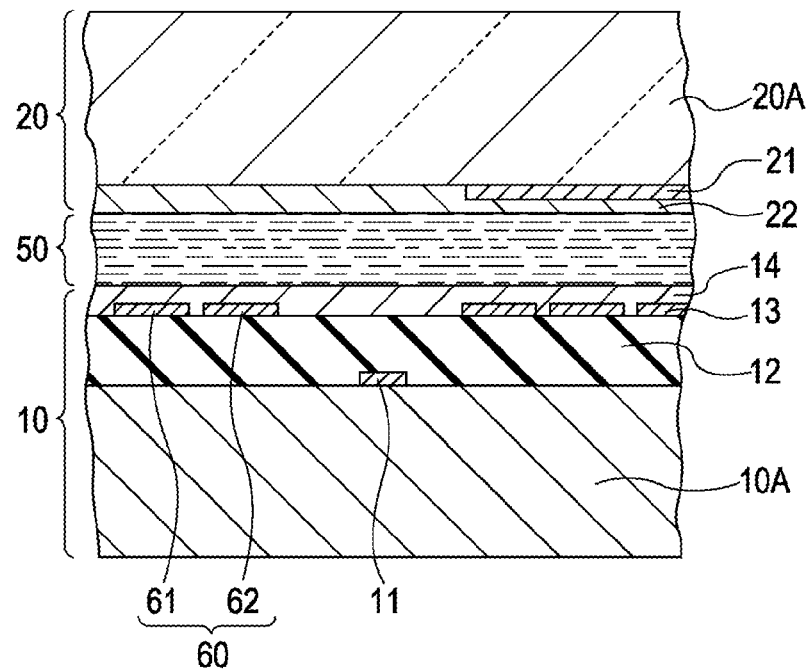
FIG. 2 is a partial cross-section view of the liquid crystal device taken along the line II-II in FIG. 1.

FIG. 1 is a plan view illustrating a liquid crystal device as an embodiment of an electrooptic device of the invention. Meanwhile, FIG. 2 is a partial cross-section view of the liquid crystal device taken along the line II-II in FIG. 1.

A liquid crystal device (electrooptic device) 100 includes: a TFT array substrate (first substrate) 10; an opposing substrate (second substrate) 20 that is disposed opposing the TFT array substrate 10; a liquid crystal layer (electrooptic material layer) 50 held between the TFT array substrate 10 and the opposing substrate 20; a sealing material 51 that is formed in a rectangular frame-like shape to surround a periphery of the liquid crystal layer 50 and has a crystal liquid injection port 51a at a certain portion thereof; and a end-sealing material 52 that seals the liquid crystal injection port 51a of the sealing material 51.

On the TFT array substrate 10, the opposing substrate 20 having the approximately same outline form as the sealing material 51 is disposed opposing the TFT array substrate 10, and the TFT array substrate 10 and the opposing substrate 20 are bonded to each other by the sealing material 51. The TFT array substrate 10 is larger in size than the opposing substrate 20 and includes a protrusion portion 10a protruding outward from an end of the opposing substrate 20. On the protrusion portion 10a, a driving IC chip 101 is mounted and a terminal unit in which a plurality of external circuit connection terminals 102 are formed is provided.

The sealing material 51 is provided along a peripheral edge of the opposed area between the TFT array substrate 10 and the opposing substrate 20. Of the four sides of the sealing material 51, the liquid crystal injection port 51a is provided at a side facing the protrusion portion 10a. The end-sealing material 52 is applied to a location in the vicinity of the liquid crystal injection port 51a in the protrusion portion 10a along an edge surface of the opposing substrate 20. The sealing material 51 and the end-sealing material 52 surround the periphery of the liquid crystal layer 50 so as to confine the liquid crystal layer 50 to a gap between the TFT array substrate 10 and the opposing substrate 20.

At the central portion of an area surrounded by the sealing material 51, there is provided a pixel area 1A having a rectangular shape in which a plurality of pixels PX are arranged in matrix form. An area formed in a rectangular frame-like shape between the pixel area 1A and the sealing material 51 is a peripheral area (outer edge area) 1B in which pixels are not formed. In the corners of the opposing substrate 20 at the outside of the sealing material 51, inter-substrate conductors 106 including a silver paste or the like to conduct electricity between the TFT array substrate 10 and the opposing substrate 20 are provided.

An ion trap portion 60 that traps ionic impurities in the liquid crystal layer 50 by generating an electric field inside the liquid crystal layer 50 is provided between the pixel area 1A and the sealing material 51. The ion trap portion 60 includes, as shown in FIG. 2, a first electrode 61 and a second electrode 62 that are formed on a base substrate 10A of the TFT array substrate 10. In the ion trap portion 60, ionic impurities in the liquid crystal layer 50 are trapped by an electric field generated between the first electrode 61 and the second electrode 62 in a direction approximately orthogonal to the depth direction of liquid crystal layer.

The ion trap portion 60 is disposed surrounding the pixel area 1A. In FIG. 1, the ion trap portion 60 is formed in a closed frame-like shape as a whole along an outer periphery of the pixel area 1A so as to trap both the ionic impurities diffusing from the pixel area 1A toward the peripheral area 1B and the ionic impurities having been eluted from the sealing material 51 and penetrating into the pixel area 1A without leakage.

The first electrode 61 is a comb-tooth shape electrode and includes a trunk electrode 61b formed in a rectangular frame-like shape along the outer periphery of the pixel area 1A and branch electrodes 61a branching off from the trunk electrode 61b so as to extend in a predetermined direction. A part of the trunk electrode 61b is extended to exterior of the sealing material 51 as a lead wire 63 and connected to the driving IC chip 101.

The second electrode 62 is also a comb-tooth shape electrode and includes a trunk electrode 62b formed in a rectangular frame-like shape along the outer periphery of the pixel area 1A and branch electrodes 62a branching off from the trunk electrode 62b so as to extend in a predetermined direction. A part of the trunk electrode 62b is extended to exterior of the sealing material 51 as a lead wire 64 and connected to the driving IC chip 101.

The first electrode 61 and the second electrode 62 are so disposed as to engage their respective branch electrodes 61a and 62a to each other. In this embodiment, the branch electrodes 61a of the first electrode 61 and the branch electrodes 62a of the second electrode 62 are formed parallel to each other and disposed alternately in a direction in which the ion trap portion 60 extends (extension direction of the peripheral area 1B). In FIG. 1, the branch electrodes 61a and 62a extend in an upper-left direction at an angle of 45 degrees.

The TFT array substrate 10 is an element substrate in which a driving element, an electrode and the like (not shown) to drive a pixel electrode 13 are formed on the base substrate 10A that is made of a transparent substrate such as glass or quartz, or of a non-transparent substrate such as silicon. As shown in FIG. 2, on the base substrate 10A, a wire 11 connected with the above-mentioned driving element, and the like are formed, and an insulating film 12 covering the driving element, the wire 11 and so on is formed. The first electrode 61, the second electrode 62, and a plurality of pixel electrodes 13 are formed on the insulating film 12. Further, an oriented film 14 is formed covering the first electrode 61, the second electrode 62, and the pixel electrodes 13. The pixel electrodes 13 are formed by using a transparent conductive material such as indium tin oxide (ITO) or the like, for example, when the liquid crystal device 100 is configured as a transmissive liquid crystal device. Meanwhile, when the liquid crystal device 100 is configured as a reflective liquid crystal device, the pixel electrodes 13 are formed by using a metal having light reflectivity such as aluminum or the like, for example. The oriented film 14 is made of an organic oriented film of polyimide or the like, or of an inorganic oriented film of a silicon dioxide film or the like.

The opposing substrate 20 includes a base substrate 20A in which a black matrix (light blocking film to define the pixels PX in a planar manner), a periphery-bordering member (light blocking film to edge the periphery of the pixel area 1A), and so on are formed on a transparent material such as glass or quartz. On the base substrate 20A, at least a common electrode 21 having a planar area corresponding to the pixel area 1A and an oriented film 22 covering the common electrode 21 are formed. The common electrode 21 is formed by, for example, a transparent conductive film of ITO or the like. In this embodiment, the common electrode 21 is not formed at an area on the opposing substrate 20 opposed to the ion trap portion 60. The oriented film 22 is made of an organic oriented film of polyimide or the like, or of an inorganic oriented film of a silicon dioxide film or the like.

The liquid crystal layer 50 is a liquid crystal layer based on a longitudinal electric field technique in which the liquid crystal layer is driven by an electric field in the depth direction of liquid crystal layer (longitudinal electric field) generated between the pixel electrodes 13 and the common electrode 21. As a longitudinal electric field technique, the vertical alignment (VA) technique is a representative one; however, other techniques such as the optically compensated birefringence (OCB) technique, the twisted nematic (TN) technique and the like can be cited.

In this embodiment, the liquid crystal layer 50 is driven by a longitudinal electric field technique in which the common electrode 21 is provided on the opposing substrate 20 side. However, the liquid crystal layer 50 may be driven in a manner such that an electrode functioning as the common electrode 21 is provided on the TFT array substrate 10 side and an electric field generated between this electrode and the pixel electrodes 13 in a substrate surface direction (transverse electric field; an electric field in a direction approximately orthogonal to the depth direction of liquid crystal layer) drives the liquid crystal layer 50. Such driving technique is called a transverse electric field technique. As a transverse electric field technique, the in-plane switching (IPS) technique, the fringe field switching (FFS) technique, and the like are representative ones; however, since burn-in is likely to occur in the FFS technique, driving techniques other than the FFS technique such as the IPS technique and the like may be preferably employed.

In the liquid crystal device 100, a voltage is applied between the first electrode 61 and the second electrode 62 before, during, or after image display processing so as to make an electric field generated between the first electrode 61 and the second electrode 62 act on the liquid crystal layer 50 to trap ionic impurities in the liquid crystal layer 50. Through this, ionic impurities generated in the pixel area 1A, ionic impurities eluted from the sealing material 51 or the end-sealing material 52, and the like can be fixed to the peripheral area 1B. As a result, the liquid crystal device 100 can be a liquid crystal device in which there arises few defects in display, such as burn-in and the like, caused by the ionic impurities being adsorbed to the oriented film 14 and the like within the pixel area 1A.

Voltages that are applied to the first electrode 61 and the second electrode 62 may be set in accordance with a polarity of the ionic impurity to be trapped. For example, in the case where a voltage of −5V is applied to the first electrode 61 and a voltage of 0V is applied to the second electrode 62, since a negative DC voltage as a whole is applied to the ion trap portion 60, ionic impurities having a positive charge in the liquid crystal layer 50 can be effectively trapped. On the other hand, in the case where a voltage of +5V is applied to the first electrode 61 and a voltage of 0V is applied to the second electrode 62, since a positive DC voltage is applied to the ion trap portion 60, ionic impurities having a negative charge can be effectively trapped.

Figure 3:
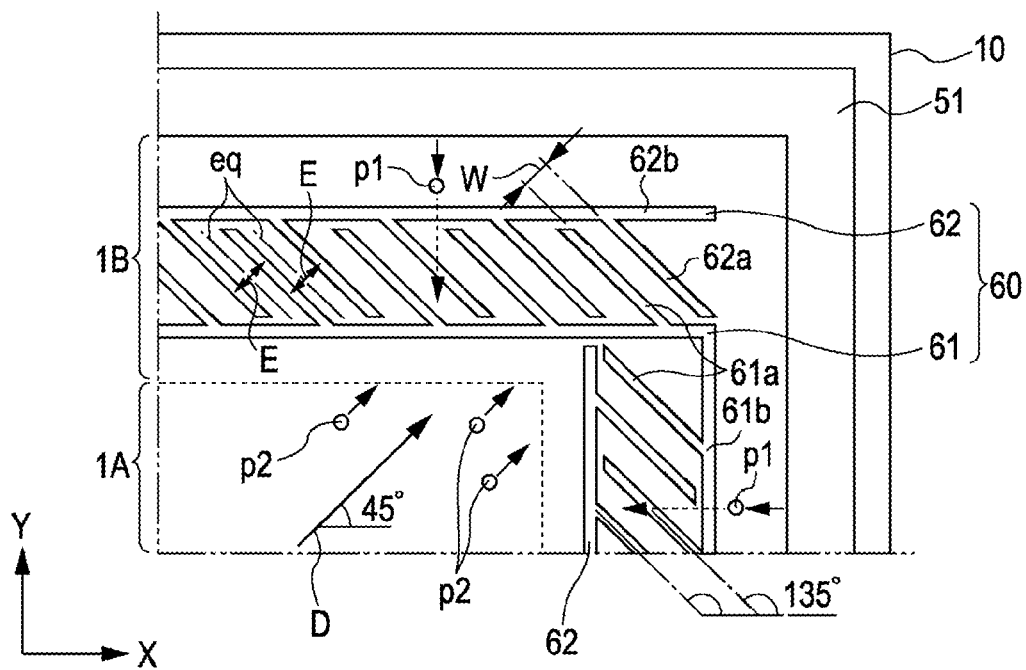
FIG. 3 is a descriptive diagram of the action of the liquid crystal device according to the embodiment.

FIG. 3 is a descriptive diagram of the action of the liquid crystal device according to this embodiment. In FIG. 3, an enlarged plan view of the portion III indicated in FIG. 1 is illustrated.

In this embodiment, both the branch electrodes 61a of the first electrode 61 and the branch electrodes 62a of the second electrode 62 extend in an oblique direction with respect to an external side of the TFT array substrate 10. To be more specific, the branch electrodes 61a and 62a extend in a direction at an angle of 135 degrees counterclockwise from the X-axis with respect to the X-axis direction (direction in which a longer side of the TFT array substrate 10 extends) in FIG. 3.

Here, ionic impurities p1 diffuse from the vicinity of the sealing material 51 toward the pixel area 1A due to difference in the concentration thereof. In the rectangular-shaped TFT array substrate 10, since the sealing material 51 is generally formed in an approximately rectangular frame-like shape along the external sides of the substrate, the ionic impurities p1 eluted from the sealing material 51 move from each of the elution points toward the pixel area 1A in a direction orthogonal to the external side in the vicinity of the elution point, as shown in FIG. 3.

Meanwhile, in the ion trap portion 60 based on the transverse electric field technique as in this embodiment, the ionic impurities p1 are adsorbed to the branch electrodes 61a and 62a by an electric field E that is formed by a potential difference between the branch electrodes 61a and 62a. At this time, equipotential lines eq between the branch electrodes 61a and 62a are formed parallel to the branch electrodes 61a and 62a as shown in FIG. 3. Here, in the case where the ionic impurity p1 is moving along the equipotential line eq, because a potential difference is not generated in a direction along the equipotential line eq, the ionic impurity p1 is unlikely to be attracted to the electrode 61a, 62a, and likely to pass through the ion trap portion 60.

In other words, in the case where the extension direction of the branch electrodes 61a and 62a is in parallel to the external sides of the TFT array substrate 10 (in parallel to the X-axis direction or Y-axis direction), the ionic impurities p1 eluted from the sealing material 51 are likely to pass through the ion trap portion 60 and diffuse into the pixel area 1A. As a result, troubles caused by the adhesion of the ionic impurities p1 to the oriented films 14, 22 and the like are likely to occur.

In contrast, in the case where the branch electrodes 61a and 62a are so formed as to extend in an oblique direction with respect to the external sides as in this embodiment, the branch electrodes 61a and 62a are disposed obliquely with respect to both the movement directions of the ionic impurity p1 that is eluted from the sealing material 51 in the vicinity of a longer side of the TFT array substrate 10 and moves in a direction along a shorter side thereof (Y-axis direction) and the ionic impurity p1 that is eluted from the sealing material 51 in the vicinity of a shorter side of the TFT array substrate 10 and moves in a direction along the longer side thereof. With this, because the electric filed E between the branch electrodes 61a and 62a has a component that coincides with the movement direction of the ionic impurity p1, a force needed to curve a trajectory of the ionic impurity p1 is small, and a force to attract the ionic impurity p1 to the branch electrodes 61a, 62a acts largely. As a result, the ionic impurities p1 are effectively adsorbed to the branch electrodes 61a, 62a.

In this embodiment, the extension direction of the branch electrodes 61a and 62a is formed at an angle of 135 degrees with respect to an external side of the TFT array substrate 10; however, the extension direction of the branch electrodes 61a and 62a is not limited thereto. More specifically, the extension direction of the branch electrodes 61a and 62a can be formed at an arbitrary angle as long as each of the electrodes does not extend in a direction orthogonal to an external side of the TFT array substrate 10 in the vicinity of which the branch electrode is formed. For example, in the ion trap portion 60 extending along a longer side of the TFT array substrate 10 (side parallel to the X-axis direction), any angle can be adopted as long as the branch electrodes 61a and 62a are not formed at an angle of 90 degrees counterclockwise from the X-axis.

While satisfying the above-mentioned angular condition, the branch electrodes 61a and 62a may be formed in a manner such that extension directions thereof differ depending on positions thereof. For example, at a position along a longer side of the TFT array substrate 10, the electrodes may be formed in a direction at an angle of 120 degrees counterclockwise from the X-axis, meanwhile at a position along a shorter side of the TFT array substrate 10, the electrodes may be formed in a direction at an angle of 30 degrees counterclockwise from the X-axis.

Meanwhile, in the case where the branch electrodes 61a and 62a are formed in a single direction in the overall liquid crystal device 100, it is preferable for the branch electrodes 61a and 62a to be formed oblique at a relatively large angle with respect to both a longer side and a shorter side of the TFT array substrate 10. Accordingly, it is the most preferable for the angle to be 135 degrees counterclockwise from the X-axis as in this embodiment, and is preferable for the angle to be at least in a range of approximately 135 degrees ±15 degrees.

Further, in the liquid crystal device 100 according to this embodiment, the ion trap portion 60 can efficiently trap ionic impurities p2 generated in the pixel area 1A as well.

To be more specific, in the liquid crystal device 100, an orientation direction D of liquid crystal molecules on the surface of the oriented film 14 in the TFT array substrate 10 is set in a direction at an angle of 45 degrees with respect to the X-axis, as shown in FIG. 3. The ionic impurities p2 generated in the pixel area 1A are likely to move along the orientation direction D, and likely to accumulate in a corner of the pixel area 1A which is located in a direction approximately along the orientation direction D (for example, see JP-A-4-86812). Accordingly, also in the liquid crystal device 100 of this embodiment, the ionic impurities p2 generated in the pixel area 1A move along the orientation direction D in the pixel area 1A and diffuse to the peripheral area 1B.

Meanwhile, the extension direction of the branch electrodes 61a, 62a is orthogonal (direction at 135 degrees) to the direction in which the ionic impurities p2 move (direction at 45 degrees), as shown in FIG. 3. Therefore, in this embodiment, a direction of the electric field E generated between the branch electrodes 61a and 62a coincides with the movement direction of the ionic impurities p2. Though this, a direction in which a force to attract the ionic impurities p2 to the branch electrodes 61a, 62a acts thereon and the movement direction of the ionic impurities p2 coincide with each other, whereby the ionic impurities p2 having reached a region on the ion trap portion 60 are smoothly adsorbed to the branch electrodes 61a, 62a without changing the movement direction thereof.

Note that the above-mentioned action that smoothly adsorbs the ionic impurities p2 is the largest in strength when the orientation direction D and the extension direction of the branch electrodes 61a, 62a are orthogonal to each other, but is harder to be obtained as the orientation direction D and the extension direction of the branch electrodes 61a, 62a come closer to a state of being parallel to each other. Accordingly, an angle formed by the orientation direction D and the extension direction of the branch electrodes 61a, 62a may be allowed to deviate from 90 degrees as long as at least they intersect with each other; however, it is preferable for the angle mentioned above to be at least in a range of 90 degrees ±45 degrees, and is more preferable to be in a range of 90 degrees ±15 degrees.

As described above, the ionic impurities p2 generated in the pixel area 1A are likely to accumulate in a specific area. Therefore, an interval W between the branch electrodes 61a and 62a of the ion trap portion 60 may be set narrower in a corner of the pixel area 1A where the ionic impurities p2 are likely to accumulate (for example, the corner indicated in FIG. 3) than the interval W at other areas. By making the interval W between the branch electrodes 61a and 62a smaller, the electric field E can be strengthened so as to hold the ionic impurities p2 in a trapped state with certainty. With this, even if the concentration of ionic impurities p2 increases in the ion trap portion 60, the impurities are made unlikely to diffuse into the pixel area 1A, thereby making it possible to suppress display troubles such as a blur, unevenness and so on from occurring in the pixel area 1A.

Electronic Apparatuses

Next, electronic apparatuses in which the liquid crystal device of the embodiment described above is applied will be described.

Figure 4A:
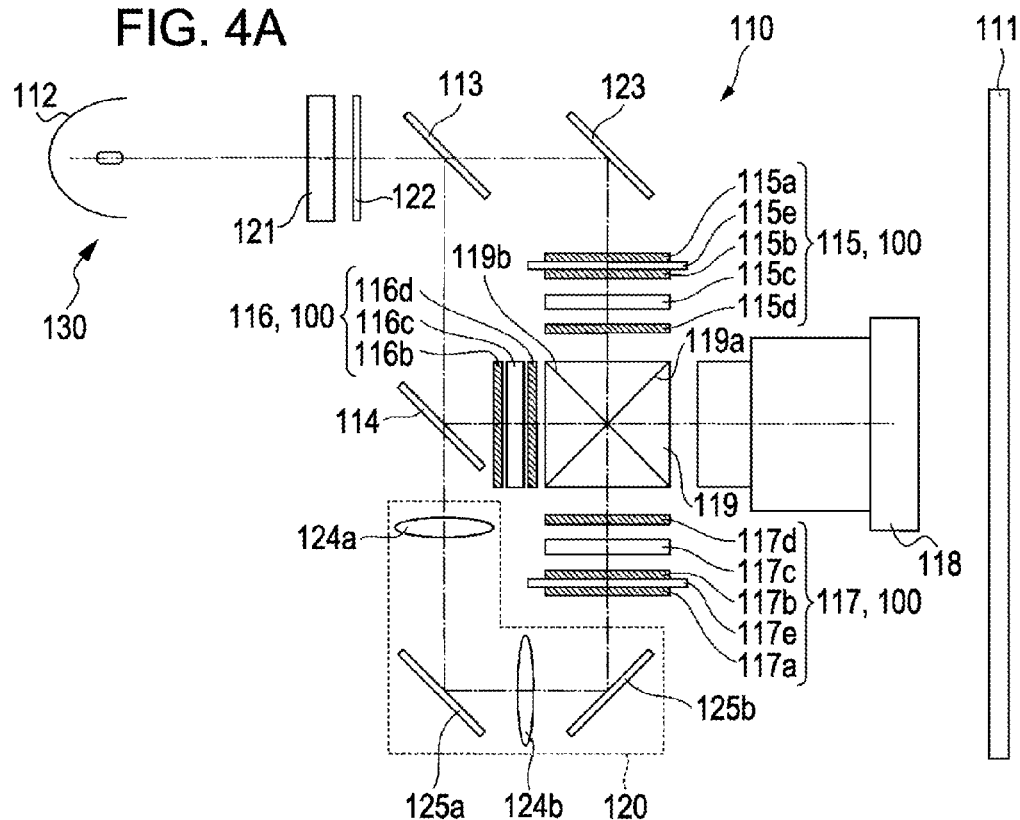
FIGS. 4A and 4B are diagrams each illustrating a projector as an embodiment of an electronic apparatus according to the invention.
Figure 4B:
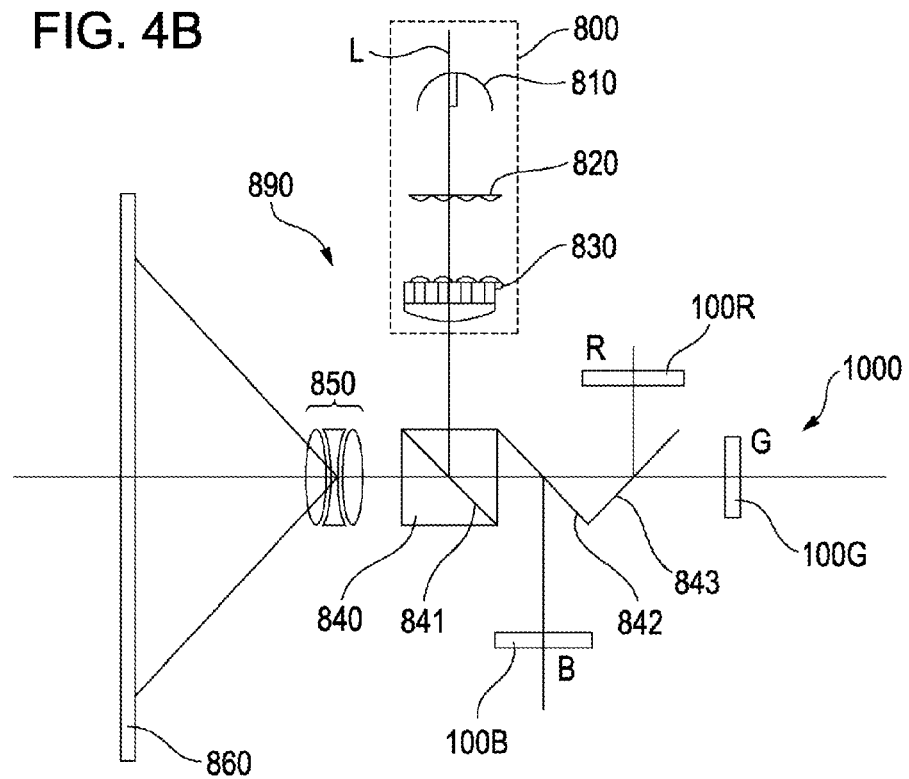

FIGS. 4A and 4B are diagrams each illustrating a projector as an embodiment of an electronic apparatus according to the invention.

FIG. 4A is a diagram illustrating a projector using a transmissive light valve.

A projector 110 is a transmissive-type display apparatus that irradiates light to a screen 111 placed in front of a viewer so as to project an image on the screen 111.

The projector 110 includes a light source unit 130 having a light source 112, dichroic mirrors 113 and 114, liquid crystal light valves 115 through 117 (liquid crystal devices 100), a projection optical system 118, a cross dichroic prism 119, and a relay optical system 120.

The light source 112 is configured by an extra-high pressure mercury lamp that supplies beams of light including a beam of red light, a beam of green light, and a beam of blue light. The dichroic mirror 113 transmits a beam of red light from the light source 112 and reflects a beam of green light and a beam of blue light. The dichroic mirror 114 transmits only the beam of blue light from among the beams of green light and blue light having been reflected by the dichroic mirror 113 and reflects the beam of green light. That is to say, the dichroic mirrors 113 and 114 configure a color-separation optical system that separates a beam of light emitted from the light source 112 into a beam of red light, a beam of green light, and a beam of blue light.

Between the light source 112 and the dichroic mirror 113, an integrator lens 121 and a polarization converter 122 are disposed in this order from the light source 112. The integrator lens 121 uniforms a beam of light emitted from the light source, and the polarization converter 122 converts a beam of light from the light source to a beam of specifically linearly-polarized light (for example, a beam of s-polarized light).

The liquid crystal device 100 of the foregoing embodiment configured as a transmissive liquid crystal device is used in the liquid crystal light valves 115 through 117 respectively. The liquid crystal light valve 115 modulates the beam of red light having passed through the dichroic mirror 113 and having reflected off a reflection mirror 123 based on an image signal, then emits the modulated beam of light toward the cross dichroic prism 119. The liquid crystal light valve 115 includes a λ/2 phase difference plate 115a, a first polarization plate 115b, a liquid crystal panel 115c, and a second polarization plate 115d. The λ/2 phase difference plate 115a and the first polarization plate 115b are adhered to a transparent glass plate 115e that hardly gives a phase difference to the transmitted beam of light. This makes it possible to suppress distortion of the λ/2 phase difference plate 115a and the first polarization plate 115b due to generated heat therein.

The liquid crystal light valve 116 modulates the beam of green light having been reflected by the dichroic mirror 114, and emits the modulated beam of light toward the cross dichroic prism 119. The liquid crystal light valve 116 includes a first polarization plate 116b, a liquid crystal panel 116c and a second polarization plate 116d.

The liquid crystal light valve 117 modulates the beam of blue light that enters the light valve via the relay optical system 120 after having passed through the dichroic mirror 114, and emits the modulated beam of light toward the cross dichroic prism 119. The liquid crystal light valve 117 includes a λ/2 phase difference plate 117a, a first polarization plate 117b, a liquid crystal panel 117c and a second polarization plate 117d. The relay optical system 120 includes a relay lens 124a, a reflection mirror 125a, a relay lens 124b and a reflection mirror 125b that are arranged in this order from the dichroic mirror 114 side (light-incident side). The beam of blue light reflected by the reflection mirror 125b is emitted toward the liquid crystal light valve 117.

The cross dichroic prism 119 is a color-combining optical system in which two dichroic films 119a and 119b are disposed orthogonal to each other in an X-shaped manner. The dichroic film 119a is a film that reflects a beam of blue light and transmits a beam of green light. Meanwhile the dichroic film 119b is a film that reflects a beam of red light and transmits a beam of green light. The cross dichroic prism 119 combines a beam of red light, a beam of green light and a beam of blue that enter the prism from the liquid crystal light valves 115 through 117 respectively, and emits the combined beam of light toward the projection optical system 118. The projection optical system 118 projects the incident beam of light onto the screen 111.

FIG. 4B is a diagram illustrating a projector using a reflective light valve.

A projector 1000 includes a light source unit 890 and three reflective liquid crystal light valves 100R, 100G and 100B (liquid crystal devices 100).

The light source unit 890 includes a polarization lighting system 800, a polarization beam splitter 840, and dichroic mirrors 842, 843. The polarization lighting system 800 includes a light source 810 disposed along a system light axis L, an integrator lens 820 that uniforms a beam of light emitted from the light source, and a polarization converter 830 that converts a beam of light from the light source to a beam of specifically linearly-polarized light (for example, a beam of s-polarized light).

The polarization beam splitter 840 reflects a beam of s-polarized light having been emitted from the polarization lighting system 800 by an s-polarized light reflection plane 841 and emits the reflected beam of light toward the dichroic mirror 842. The dichroic mirror 842 selectively reflects a beam of blue light component included in the incident beam of light, and emits the reflected beam of light toward the liquid crystal light valve 100B. A beam of light having passed through the dichroic mirror 842 (red light component, green light component) is emitted toward the dichroic mirror 843. The dichroic mirror 843 selectively reflects a beam of red light component included in the incident beam of light, and emits the reflected beam of light toward the liquid crystal light valve 100R. A beam of light having passed through the dichroic mirror 843 (green light component) is emitted toward the liquid crystal light valve 100G. In this manner, the light source unit 890 supplies predetermined colors of light to the three liquid crystal light valves 100R, 100G, and 100B respectively.

The liquid crystal light valves 100R, 100G and 100B respectively modulate the incident beam of light based on an image signal, and then reflect and emit the modulated beam of light toward the light source unit 890. The light source unit 890 combines the modulated beams of red light, green light and blue light that enter the light source unit from the liquid crystal light valves 100R, 100G and 100B respectively, and emits the combined beam of light toward a projection optical system 850. The projection optical system 850 projects the incident beam of light onto a screen 860.

In the projectors 110 and 1000 as shown in FIGS. 4A and 4B respectively, a light source unit using an LED (light emitting diode) light source may be included in the configurations. The LED light source may emit either white light or separate beams of red, green and blue light.

The liquid crystal device 100 of the foregoing embodiment can be applied to various kinds of electronic apparatuses in addition to the projectors described above. For example, it can be used in mobile phones, information terminals, digital cameras, liquid crystal televisions, navigation systems, television telephones, POS terminals, and so on. Further, it may be used as a direct-view-type display device in these electronic apparatuses.

This application claims priority from Japanese Patent Application No. 2011-159616 filed in the Japanese Patent Office on Jul. 21, 2011, the entire disclosure of which is hereby incorporated by reference in its entirely.

What is claimed is:

1. An electrooptic device comprising:
   a first substrate and a second substrate that are disposed opposing each other with an electrooptic material layer therebetween;
   a sealing material that bonds the first substrate and second substrates to each other;
   a pixel area in which a plurality of pixels are arranged; and
   an ion trap portion that is formed between the pixel area and the sealing material,
   wherein the ion trap portion is formed on the electrooptic material layer side of the first substrate, and includes a first electrode and a second electrode that are formed in a comb-tooth shape when viewed from above and are disposed so that branch electrodes of the first electrode and branch electrodes of the second electrode are engaged with each other, and
   a direction in which the branch electrodes of the first and second electrodes extend is oblique with respect to an external side of the first substrate in the vicinity of those branch electrodes, and intersects with an orientation direction of the electrooptic material at an interface between the electrooptic material layer and the first substrate.

2. The electrooptic device according to claim 1, wherein the direction in which the branch electrodes extend is a direction that intersects with the orientation direction of the electrooptic material at an angle of equal to or greater than 75 degrees and equal to or less than 105 degrees.

3. The electrooptic device according to claim 2, wherein the direction in which the branch electrodes extend is a direction that is approximately orthogonal to the orientation direction of the electrooptic material.

4. The electrooptic device according to claim 1, wherein the pixel area is formed in an approximately rectangular shape when viewed from above, and intervals between the branch electrodes of the first electrode and the branch electrodes of the second electrode are smaller at areas of the ion trap portion that are located in two corners of the pixel area approximately facing the orientation direction of the electrooptic material than the intervals therebetween at other areas of the ion trap portion.

5. An electronic apparatus comprising the electrooptic device according to claim 1.

6. The electrooptic device according to claim 1, wherein the first substrate comprises a plurality of external sides, and
   the each branch electrode of the branch electrodes are oblique, from a planar view, with respect to each external side of the plurality of external sides the first substrate.

7. The electrooptic device according to claim 6, wherein the first electrode comprises a first trunk electrode from which the branch electrodes of the first electrode extend,
   the second electrode comprises a second trunk electrode from which the branch electrodes of the second electrode extend, and
   the direction in which the branch electrodes of the first electrode and second electrodes extend is oblique, from a planar view, with respect to the first trunk electrode and the second trunk electrode.

8. The electrooptic device according to claim 1, wherein the first substrate comprises a plurality of external sides, and the first electrode comprises a first trunk electrode extending around the pixel area and from which the branch electrodes of the first electrode extend,
   the second electrode comprises a second trunk electrode extending around the pixel area and from which the branch electrodes of the second electrode extend, and
   each portion of the first trunk and each portion of the second trunk is orthogonal or parallel, from a planar view, to each external side of the plurality of external sides.

9. The electrooptic device according to claim 1, wherein the direction in which the branch electrodes extend is a direction that intersects with the orientation direction of the electrooptic material at an angle of equal to or greater than 45 degrees and equal to or less than 135 degrees.

10. An electrooptic device comprising:
    a first substrate;
    a second substrate;
    an electrooptic material layer that is disposed between the first substrate and the second substrate; and
    a sealing material that bonds the first substrate and second substrates to each other,
    wherein the first substrate including:
    a pixel area in which a plurality of pixels are disposed;
    a first electrode that is formed between the pixel area and the sealing material in planar view, and is formed on a side of the electrooptic material layer side of the first substrate; and
    a second electrode that is formed between the pixel area and the sealing material in planar view, and is formed on a side of the electrooptic material layer side of the first substrate,
    wherein
    the first electrode having a first trunk electrode and a plurality of first branch electrodes that branch off from the first trunk electrode so as to extend in a first direction,
    the second electrode having a second trunk electrode and a plurality of second branch electrodes that branch off from the second trunk electrode and are engaged with the plurality of first branch electrodes so as to extend in a second direction, and
    the first direction and the second direction is oblique with respect to an external side of the first substrate, and intersects with an orientation direction of the electrooptic material at an interface between the electrooptic material layer and the first substrate.

11. The electrooptic device according to claim 10, wherein the direction in which the plurality of first branch electrodes and the plurality of second branch electrodes extend is a direction that intersects with the orientation direction of the electrooptic material at an angle of equal to or greater than 75 degrees and equal to or less than 105 degrees.

12. The electrooptic device according to claim 11,
wherein the direction in which the plurality of first branch electrodes and the plurality of second branch electrodes extend is a direction that is approximately orthogonal to the orientation direction of the electrooptic material.

13. The electrooptic device according to claim 10,
wherein the first direction, in which the first branch electrodes extend from the first trunk, and the second direction, in which the second branch electrodes extend from the second trunk, are oblique with respect to a direction in which the first trunk electrode extends and a direction in which the second trunk electrode extends.

14. The electrooptic device according to claim 10,
wherein the direction in which the branch electrodes extend is a direction that intersects with the orientation direction of the electrooptic material at an angle of equal to or greater than 45 degrees and equal to or less than 135 degrees.

15. An electrooptic device comprising:
a first substrate and a second substrate that are disposed opposing each other with an electrooptic material layer therebetween;
a sealing material that bonds the first substrate and second substrates to each other;
a pixel area in which a plurality of pixels are arranged; and
an ion trap portion that is formed between the pixel area and the sealing material,
wherein the ion trap portion is formed on the electrooptic material layer side of the first substrate, and includes a first electrode and a second electrode that are formed in a comb-tooth shape when viewed from above and are disposed so that branch electrodes of the first electrode and branch electrodes of the second electrode are engaged with each other,
a direction in which the branch electrodes of the first and second electrodes extend is oblique with respect to an external side of the first substrate in the vicinity of those branch electrodes, and intersects with an orientation direction of the electrooptic material at an interface between the electrooptic material layer and the first substrate, and
the direction in which the branch electrodes extend is a direction that intersects with the orientation direction of the electrooptic material at an angle of equal to or greater than 75 degrees and equal to or less than 105 degrees.

16. The electrooptic device according to claim 15,
wherein the direction in which the branch electrodes extend is a direction that is approximately orthogonal to the orientation direction of the electrooptic material.

* * * * *